United States Patent [19]

Schaefer et al.

[11] Patent Number: 4,675,147
[45] Date of Patent: Jun. 23, 1987

[54] GENERATING AN INTEGRATED GRAPHIC DISPLAY OF THE SAFETY STATUS OF A COMPLEX PROCESS PLANT

[75] Inventors: William F. Schaefer, North Huntingdon; James L. Little, Pittsburgh; Kenneth F. Cooper; James R. Easter, both of Pittsburgh, all of Pa.

[73] Assignee: Westinghouse Electric Corp., Pittsburgh, Pa.

[21] Appl. No.: 482,641

[22] Filed: Apr. 6, 1983

[51] Int. Cl.[4] ............................................. G21C 17/00
[52] U.S. Cl. ................................. 376/245; 364/521; 364/551; 364/582
[58] Field of Search ............... 364/481, 492, 521, 522, 364/551, 582; 376/245, 248

[56] References Cited

U.S. PATENT DOCUMENTS 3,811,040  5/1974  Weinfurt et al. .

FOREIGN PATENT DOCUMENTS 2208633  8/1973  France .

OTHER PUBLICATIONS

"A Versatile Presentation of Parameters for Rapid Recognition of Total State", J. A. Colkin.
"Development and Enhancement of Man–Machine Interface on Operating Nuclear Power Plants", Cooper et al., 1980.
"A Design Methodology for the Man–Machine Interface for Nuclear Power Plant Emergency Response Facilities", Woods et al., Apr. 1981.
IBM Technical Disclosure Bulletin vol. 18, No. 2, Jul. 1975.

Primary Examiner—Deborah L. Kyle
Assistant Examiner—Richard W. Wendtland
Attorney, Agent, or Firm—Daniel C. Abeles

[57] ABSTRACT

The real time actual and reference values of parameters pertinent to the key safety concerns of a pressurized water reactor nuclear power plant are used to generate an integrated graphic display representative of the plant safety status. This display is in the form of a polygon with the distances of the vertices from a common origin determined by the actual value of the selected parameters normalized such that the polygon is regular whenever the actual value of each parameter equals its reference value despite changes in the reference value with operating conditions, and is an irregular polygon which visually indicates deviations from normal otherwise. The values of parameters represented in analog form are dynamically scaled between the reference value and high and low limits which are displayed as tic marks at fixed distances along spokes radiating from the common origin and passing through the vertices. Multiple, related binary signals are displayed on a single spoke by drawing the associated vertice at the reference value when none of the represented conditions exist and at the high limit when any such condition is detected. A regular polygon fixed at the reference values aids the operator in detecting small deviations from normal and in gauging the magnitude of the deviation. One set of parameters is selected for generating the display when the plant is at power and a second set reflecting wide range readings is used the remainder of the time such as following a reactor trip. If the quality of the status, reference or limit signals associated with a particular vertice is "bad", the sides of the polygon emanating from that vertice are not drawn to appraise the operator of this condition.

32 Claims, 11 Drawing Figures

GENERATING AN INTEGRATED GRAPHIC DISPLAY OF THE SAFETY STATUS OF A COMPLEX PROCESS PLANT

BACKGROUND OF THE INVENTION

This invention relates to a method and apparatus for generating a visual display of the real time safety status of a complex process plant and more particularly to a dynamically scaled, integrated graphic display which visually conveys information regarding abnormal operating conditions in the plant as deviations in the shape of regular geometric figures. The invention has particular application and is specifically described as applied to a nuclear power plant.

PRIOR ART

The modern nuclear power plant is a complex system of operating and safety components which must be continuously controlled and monitored by an operating crew located in a control room. The safe and efficient operation of such a complex system necessitates the presentation to the operating crew of readings of hundreds of operating parameters at points located throughout the plant. The sheer number of readings in itself places a sizeable load on the capability of the crew to absorb all the information and make meaningful judgments based upon that information. The crew must not only base their judgments upon the condition of the individual parameters being monitored, but they must also be able to assimilate the readings presented in order to evaluate the overall status of the system and to understand the events which are occurring in the system. Recent events have demonstrated that it is extremely important that the operating crew have the capability of quickly and accurately assessing abnormal conditions in the system so that timely and effective steps can be taken to terminate such conditions or to at least mitigate their effects. Similar problems of organizing and presenting large amounts of data are present in other types of complex process plants, such as oil refineries.

Heretofore, the required information has been presented to the operating crew by meters and dials and by status lights or flags. In some cases cathode ray tubes (CRT's) have been used, but primarily to group the same types of readings together for convenience or to project data onto a schematic diagram of the plant or a selected portion thereof. While the latter display assists the crew in relating the data to the appropriate part of the plant, it is still a numerical presentation.

The difficulty with presenting large amounts of data on individual meters or gauges or in numerical form is that the operator must absorb it serially. The human operator, however, has a limited ability to store serially presented information for rapid recall even though such an ability is necessary in order to make decisions based upon the values of, and relationships between, a number of system parameters. On the other hand, it has long been recognized that humans have a highly developed capability of shape perception and memory; that we can observe a scene and instantly evaluate, and remember, many complex relationships expressed thereby. Thus the significance of a group of data is much more readily appreciated when it is presented in graphical form rather than as a table of numbers. The human system much prefers the parallel input of information as in a pictorial presentation to the serial input of numerical data.

In recognition of the ability of humans to readily absorb information expressed in spacial relationships, consideration has been given to presenting data to human observers in bar graph form with graphs representing several critical parameters presented simultaneously on a CRT. A similar type of display is the multilevel diagram in which portions of a continuous line across a CRT represent the vairous parameters. By selecting the scaling such that all the levels are the same under normal conditions, any deviation by an individual parameter from normal is readily apparent.

Work has also been done on using polar coordinate graphs to present data to observers required to make decisions based upon a plurality of parameters. In a polar coordinate graph, a number of angularly spaced lines, one for each parameter, radiate from a common point. In one form, the length of each line represents the value of the associated parameter. In another form, the lines only represent the scale for the associated parameter and the actual value of that parameter is a point on the line. In such an arrangement, the reading for each parameter is connected to the reading for each adjacent parameter by straight lines to form a polygon. Through equal angular spacing of the radiating lines, and by appropriate scaling of each parameter, the display can be made to take the form of a regular polygon for the normal condition of each parameter. Even a slight change in one or more of the parameter values causes a distortion of the regular polygon configuration which is readily detectable by the human observer. It has been suggested that the resolution of such displays can be improved by providing a continuous display of the "normal" polygon in addition to the polygon formed by the actual readings. Furthermore, interpretation of the data presented can be enhanced by providing additional polygons on the display connecting the maximum and minimum values for each parameter to provide an indication of the state of the monitored system relative to the acceptable limits. It has also been suggested that interdependent parameters can be grouped next to each other on a polar coordinate graph and deviations from the norm can be represented by angular rotation of the appropriate axes. This can be done in lieu of, or in addition to, radial deflection of the associated reading. In the latter case, an extra dimension is added to the display.

The above mentioned graphical displays were discussed by J. A. Coekin of the University of Southampton, England in a paper entitled "A Versatile Presentation of Parameters for Rapid Recognition of Total State". This article reviewed suggestions that such displays could be used in the medical field to provide assistance in diagnosis by displaying simultaneously several, such as eight, physiological parameters including temperature, blood pressure, heart rate, white cell count, etc. It was further suggested that diagnosis could be aided by comparing successive time displaced figures. Coekin then considered the application of such polar coordinate displays to improve the presentation of data to supervisors of engineering systems. Specifically, it was suggested that the polygon display could be used by a tester to quickly recognize an object which was out of tolerance.

As far as it is known to us, in all of these prior art applications of polygon type displays, the normal value for each parameter remains fixed. In a nuclear power plant, however, the normal or desired values for the various parameters are not static but dynamic and vary in accordance with the operating condition of the plant. While the present plant control systems generate the dynamic references; if such references were applied directly to the prior art displays, the reference polygon would also modulate in shape thereby making quick, accurate analysis very difficult.

SUMMARY OF THE INVENTION

The overall object of the present invention is to provide the operator and supervisors of a complex process plant with a concise representation of the overall health of the plant with respect to vital safety functions in terms which they can easily comprehend and communicate.

According to the invention, a real time display of the safety status of the plant is generated on a visual display device such as a cathode ray tube (CRT) by generating status signals representative of the value of operating parameters selected as being pertinent to the determination of the plant's safety status. Since the expected values of these parameters vary with the operating condition of the plant, reference signals representative of the target value for each of the status signals at the current operating level of the plant are also generated. The status signals are then normalized to the associated reference signals in such a manner that the normalized status signal has a fixed, preselected magnitude when the status signal equals the associated reference signal regardless of the magnitude of the reference signal and has a magnitude proportional to this preselected magnitude otherwise. The display, which emanates from a common origin on the CRT, is generated from the normalized status signals with respective sectors of the display each being defined by the magnitude of a normalized status signal in such a manner that with all the operating parameters measured at the target values, all of the respective sectors of the display exhibit an equal relationship to the origin.

Preferably, the display defines a polygon with the distances of the vertices from the common origin determined by the magnitude of the normalized status signals. The polygon is regular, with all of the vertices a first fixed distance from the common origin, when all parameters are at their target value regardless of what the target value might be and despite dynamic changes in the target values.

Some of the status signals are analog and some are binary. For the analog signals, limit signals are also generated and are normalized by locating indicia representative of all the high limits a second fixed distance from the common origin and indicia representative of all the low limits a third fixed distance from the origin regardless of the real magnitudes of these limits. The actual values of the operating parameters are then indicated by locating the vertices of the polygon relative to the fixed distance on the appropriate scale determined by the current values of the reference signal and the limit signals. For instance, the scale determined by the reference signal and the upper limit signal is used when the magnitude of the status signal exceeds that of the reference signal while the relative magnitudes of the reference signal and the lower limit signal determine the scale when the magnitude of the status signal is below that of the reference signal. Obviously, these scales are not necessarily the same, and the scales vary as the magnitude of the reference signal and/or the limit signals vary.

In effect, the location of the vertices of the polygon relative to the fixed distance graphically illustrates the percentage of deviation of the respective analog operating parameters from the target value within the current operating limits. To aid in visual perception of this deviation, a reference polygon which is a regular polygon with all of its vertices located at the first fixed distance from the common origin is also generated on the display. This reference polygon, which is distinguished from the polygon representing the actual value of the parameters such as by using dashed instead of full lines and/or by color differentiation, allows the operator to detect even very small deviations from target values without being located directly at the display device (e.g., the operator may view the display from quite a distance—20 ft. vs. a standard 36" for a CRT). This is a unique benefit from the display. The display may also include spokes radiating from the common origin and extending outwardly through the vertices of the polygons with the low and high limits indicated as tic marks on the spokes.

For the binary status signals which represent the presence or absence of a pertinent operating condition, the associated vertice of the polygon is displayed at the reference value which is located at the first fixed distance from the common origin in the absence of the selected condition or at the second fixed distance when the condition is present. Two or more binary signals can be displayed on a spoke so that the associated vertice of the polygon is displayed at the second fixed distance from the origin if any of the associated conditions are present. Alphanumeric readouts on the display can be used to indicate which condition or conditions are represented by the off normal indication.

While the invention is applicable to various types of complex process plants, such as for example, oil refineries, it has particular application to nuclear power plants. As such, it is adapted to use both during normal conditions, when the reactor is at power, and during the remaining time which could include accident situations. Since some different parameters are selected as providing pertinent safety information in the two modes of operation, two displays are generated. In the embodiment of the invention disclosed in detail below, both displays generate an octagon, however, the parameters which are represented by some of the corresponding vertices of the two octagons are different to reflect the different consideration that must be addressed in each case.

As applied to any nuclear plant, the parameters selected for display in the two modes of operation are chosen based on their relevance to specifically identified key safety concerns. For the pressurized water reactor nuclear plant, six key safety concerns have been identified: saturation of the reactor coolant, reactivity excursion, loss of primary coolant inventory, loss of pressure and temperature control, radioactive release and containment environment. In each plant operating mode, a set of parameters which best provides succint information relative to these six key safety concerns is selected for display. The selected parameters in each display are arranged to enhance operator comprehension of plant safety status.

As another feature of the invention, the quality of status signals representing the measured or calculated values of the selected parameters, the reference signals and limit signals is determined and is communicated to the operator through the display. By "quality" is meant the reasonableness of the sensor signals, which are verified by known instrumentation techniques. If the quality of any of these signals associated with a parameter is "bad", the sides of the polygon adjacent the vertice representing that parameter do not appear on the display. Furthermore, if it is one of the limit signals which exhibits "bad" quality, the corresponding indicia on the display, such as for example, the color of the tic mark, is altered to notify the operator of that fact.

The invention encompasses both the method for generating the unique graphic display as well as the apparatus.

DESCRIPTION OF THE PREFERRED EMBODIMENT

Figure 1:
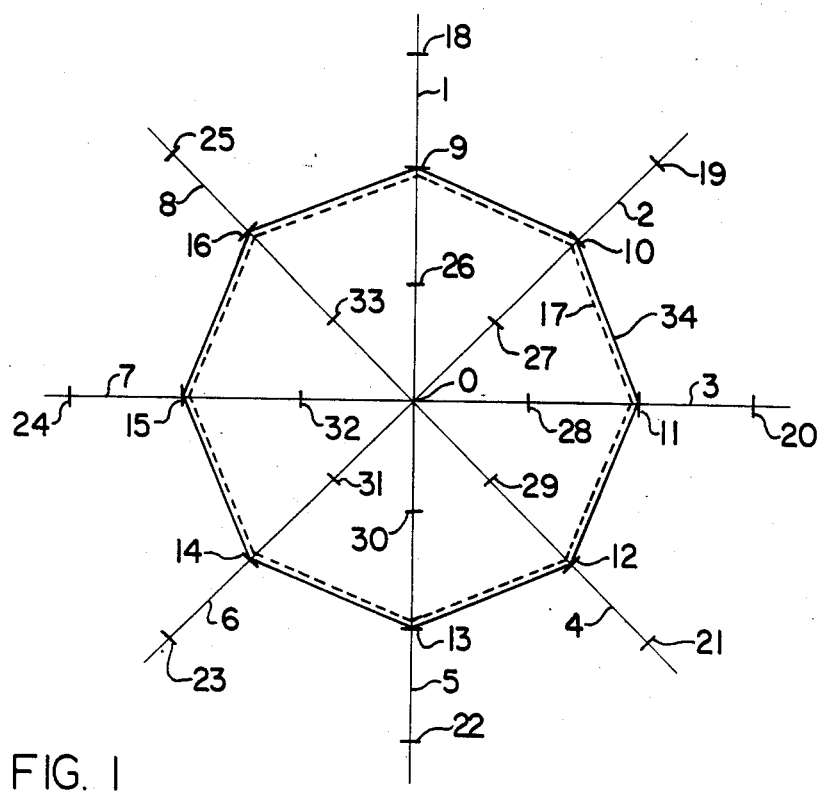
FIG. 1 is a graphic display for monitoring the safety status of a nuclear fueled electric power generating plant incorporating the principles of the subject invention.

While the present invention can be applied to various types of complex process plants, it will be described in detail as applied to a nuclear power plant, and specifically, a pressurized water reactor plant. As such, it is part of a system referred to as the Plant Safety Status Display system (PSSD) which is designed to monitor the operation of a nuclear power plant and to present to the operator and supervisors summary information on plant safety status. The basic function of the PSSD is the gathering of a very large number of input parameters and organizing and presenting such data at several levels of detail. The present invention is directed to presentation of useful information at the highest level in the hierarchy. At this level the operator is interested primarily in detecting abnormal conditions. Other levels of the hierarchy can then be referred to to obtain more detailed information for reacting to the condition, making a diagnosis of the problem and implementing corrective action. The operator may then want to return to the high level display to obtain feedback as to the effectiveness of the actions taken or to prepare for the next cycle of actions.

The top level display of the PSSD which is the subject of the present invention is primarily directed to assisting the operator in the detection of abnormal conditions in plant operation. This detection activity can be divided into two categories which are dependent primarily on the operating status of the plant. With the reactor at power and safety systems not activated, the operator's role is to be alert for deviations in the plant process which might lead to, or be indicative of, problems in satisfying critical safety functions. There might exist situations for which the operator could take corrective action and terminate the event prior to the activation of reactor safeguards systems. In order to efficiently perform in this "terminate mode" the operator requires parameters in terms of narrow range indication and function which are meaningful during power operation. In the second category of the detection activity, the operator is concerned with the overall state of the plant with respect to the operational boundaries which guarantee the satisfaction of critical safety functions over the full operating range of the plant. This mode also includes the accident situations following the automatic initiation of the reactor safeguards systems for which the primary action is mitigation rather than termination. In the "mitigate" mode, parameters are chosen with larger ranges because of the requirement to represent the state of the plant over a wide range of operations and conditions.

The role for which the PSSD provides support for each of the operating modes is as follows:

TERMINATE MODE

1. Monitor the plant process for abnormalities indicative of slow transients that do not result in immediate reactor trips and for which the control room operator might take corrective or protective action.
2. Monitor the integrity of the various boundaries to radioactive release.

MITIGATE MODE

1. Monitor the safety status of the as-tripped condition.
2. Monitor the conditions which might lead to a breach of any of the levels of defense against radioactive release.
3. Monitor the condition of the barriers to radioactive release.

In the case of the pressurized water reactor, the safety status of the plant for any event can be evaluated in terms of six basic safety concerns. These concerns can be stated as follows:

1. Saturation of Reactor Coolant
2. Reactivity Excursion
3. Loss of Primary Coolant Inventory
4. Loss of Pressure and Temperature Control
5. Radioactive Release
6. Containment Environment By addressing these key safety concerns, the consequences of abnormal events can be limited or mitigated.

The key safety concerns can be related to specific abnormal occurrences. Some typical postulated events for the two PSSD operating modes and the relation of the key safety concerns to those events are as follows:

TERMINATE MODE

Reactor Control Systems Malfunction
  Reactivity Excursion
  Loss of Pressure and Temperature Control
  RCS Makeup Control System Malfunction Reactivity Excursion
  Loss of Primary Coolant Inventory
  Loss of Pressure and Temperature Control
Inadvertent Depressurization (Slow)
  Loss of Pressure and Temperature Control
Reactor Coolant System Leak
  Loss of Primary Coolant Inventory
  Radioactive Releases
  Loss of Pressure and Temperature Control

MITIGATE MODE

Reactor Trip
  Loss of Pressure and Temperature Control
  Saturation of Reactor Coolant System
Station Blackout
  Loss of Pressure and Temperature Control
  Saturation of Reactor Coolant System
Emergency Boration
  Reactivity Excursion
Operation with Natural Circulation
  Loss of Pressure and Temperature Control
  Saturation of Reactor Coolant System
Spurious Safety Injection
  Determine that key safety concerns are not violated and terminate injection.
Loss of Reactor Coolant
  Loss of Primary Coolant Inventory
  Loss of Pressure and Temperature Control
  Saturation of Reactor Coolant
  Radioactive Releases
  Containment Environment
  Radioactive Waste Management
Loss of Secondary Coolant
  Saturation of Reactor Coolant
  Reactivity Excursion
  Loss of Pressure and Temperature Control
  Radioactive Releases
  Containment Environment
Steam Generator Tube Rupture
  Saturation of Reactor Coolant
  Loss of Primary Coolant Inventory
  Loss of Pressure and Temperature Control
  Radioactive Releases It must be noted that the above events are typical and it is conceivable for multiple events to occur in undefinable sequences. For this reason, the PSSD is designed on the basis of key safety concerns rather than specific scenarios.

In defining the inputs for the PSSD, two requirements have to be met as follows:
1. The inputs selected must represent a minimum set sufficient for monitoring all possible events including those which might not have been anticipated.
2. The selection of inputs must address conditions with potentially erroneous signals, conflicting indications, and parameters out of range (i.e., redundancy and diversity).

In response to the first requirement, the function of the PSSD has been considered in two ways. The primary function is to monitor the plant process in terms of satisfying the key safety concerns. As stated above, by guaranteeing that these concerns are addressed, the conditions of unanticipated events or event sequences can be satisfied. The second function of the PSSD is to support the monitoring function of the plant for postulated events and to provide a man-machine interface design that supports a defined evaluation process and procedures for responding to abnormal events.

In order to satisfy the second consideration of evaluating erroneous signals and the need for redundancy and diversity, the PSSD performs operations upon multisensor inputs to identify erroneous signals and provides the operator with a diverse method of indicating the plant process. The inputs to the PSSD are chosen upon the basis of their direct relevance to the key safety concerns.

In the detection activity, the operator requires some information with regard to the margins that exist between the current state of the plant and a set of operational limits in order to quantify to some extent any deviation present in the process. In the terminate mode the focus is primarily upon the boundaries imposed by the automatic reactor safeguards systems: safety injection set points, reactor trip setpoints, etc. In the mitigate mode, the boundaries are defined by the absolute limits to critical safety functions: overpressurization and saturation of the reactor coolant system. The information content in the display should be such that parameters that represent significant deviations in the process should be highlighted. The parameters chosen for the display should be selected such that when an event occurs, the operator should be able to easily interpret that set of highlighted information in order to form some initial hypothesis as to the area of concern and to determine what portion of the display hierarchy should be accessed in the following activities of reaction and diagnosis.

The top level PSSD display which is the subject of this invention is a graphic representation of the status of the critical safety concerns. Two displays are generated: one for the terminate mode and another for the mitigate mode. Both are polar coordinate displays emanating from a common origin. An example of such a display is illustrated in FIG. 1. The spokes 1 through 8 radiating from the common origin 0 each represents the scale for one or more process parameters. The points 9 through 16, which are all a fixed distance from the common origin 0, represent the target or reference value for the associated parameter or parameters. By joining the points 9 through 16 by a dashed line 17 a regular polygon, in the example shown, an octagon, is formed. The actual value of each parameter is also plotted on the associated spoke. Positive deviations from the target value are shown at points further away from the common origin 0 than the reference values and negative deviations are plotted closer to the origin. Upper limits for each parameter are plotted at points 18 through 25 at a second fixed distance from the common origin 0 outside the reference values and lower limits are plotted at points 26 through 33 which are all at a third fixed distance from the origin which is inside the reference values. When all of the parameters are at their reference values, the actual value of each parameter is plotted at the first fixed distance from the common origin 0 and a regular polygon, which overlays the reference polygon, is formed by connecting the actual parameter values by a solid line 34.

Since the reference values and upper and lower limits are all plotted at fixed distances from the common origin, 0, the scale between the reference value and the upper limit on which positive deviations from the target value are plotted will, in most cases, be different from the scale between the reference value and the lower limit on which negative deviations are plotted. Furthermore, the reference values, and in the case of some parameters, the limit values, vary with changes in the operating conditions of the reactor so that the scales themselves also change. In order to maintain the uniform reference figure and limit marks discussed above which give the operator a standardized reference from which he can detect and evaluate deviations from normal, it becomes necessary to dynamically scale the axes of the graphic display.

Figure 2:
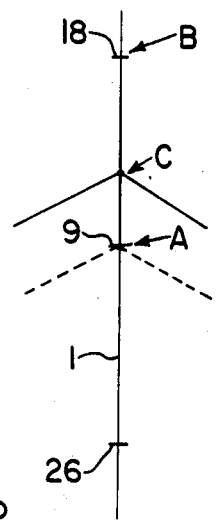
FIG. 2 is a view of part of the display of FIG. 1 illustrating the manner in which the display is dynamically scaled.

The manner in which positive deviations from the reference value are determined is illustrated in FIG. 2 where A equals the reference value, B equals the upper limit and C equals the actual value of the parameter. The numerical value of the line A-B is equal to the upper limit minus the reference value. The location of point C is determined by dividing the actual value of the parameter minus the reference value by the value of the line A-B. The result is a normalized fraction having a value which ranges from zero to one. This relationship may be expressed by the formula:

$$X = \frac{\text{(Actual value)} - \text{(Reference value)}}{\text{(High limit)} - \text{(Reference value)}} \qquad \text{Equation (1)}$$

When the actual value is less than the reference value, the location of the actual value of the parameter on the scale defined by the reference value and the lower limit is determined by the formula:

$$X = \frac{\text{(Reference value)} - \text{(Actual value)}}{\text{(Reference value)} - \text{(Lower limit)}} \qquad \text{Equation (2)}$$

From these equations (1) and (2) it will be realized that the location of the normalized actual value of the parameter is expressed in terms of the percentage of deviation of the actual value from normal toward the pertinent limit. When an actual value exceeds a limit in either direction, the vertice is plotted at the limit but since, as will be seen, the numerical value of the parameter appears on the display, the operator will be aware of the condition.

The display shown in FIG. 1 is preferably generated in color. The reference information such as the spokes 1 through 8 and the dashed reference polygon 17 are shown for instance, in blue. The polygon 34 representing the actual value of the parameters is shown for instance, in yellow. The tic marks 18 through 25 representing the high limits and 26 through 33 representing the low limits are normally presented in yellow. In order to further warn the operator when the actual value of a parameter equals or exceeds a limit value, the associated tic mark is displayed in red. Of course, the vertice of the polygon representing that parameter will be located at the tic mark, but the change in color of the tic mark from yellow to red highlights that fact for the operator.

As mentioned previously, reliability of the input data is important to the usefulness of the entire PSSD system. Accordingly, multiple sensors are employed and techniques known in the art are used to determine the quality of each of the parameter values including the reference values and limits. Four levels of quality are assigned to each value: good, manual, poor, and bad. If the quality of the actual parameter value, the reference value or either of the limit values is bad, the corresponding vertice and the two sides of the polygon leading from it are not displayed. Furthermore, if it is one of the limits which has bad quality, the associated tic mark is presented in purple to notify the operator of that fact.

Some of the parameters which are monitored in connection with the key safety concerns are conditions, which are either present or not, such as radiation in containment above a threshold level. Such parameters are represented by binary status signals. When the condition is not present, the binary signal is displayed at the reference value. When it is present, the binary signal is displayed at the high limit. In order to present more information with a given polygon display, more than one binary signal can be represented by a particular vertice of the polygon and therefore, by the associated spoke. In this arrangement, if any of the conditions represented by the binary signals are present, the associated vertice of the polygon is displayed at the upper limit. Alphanumeric indicia adjacent the spoke indicate which one or ones of the conditions are present.

Figure 3:
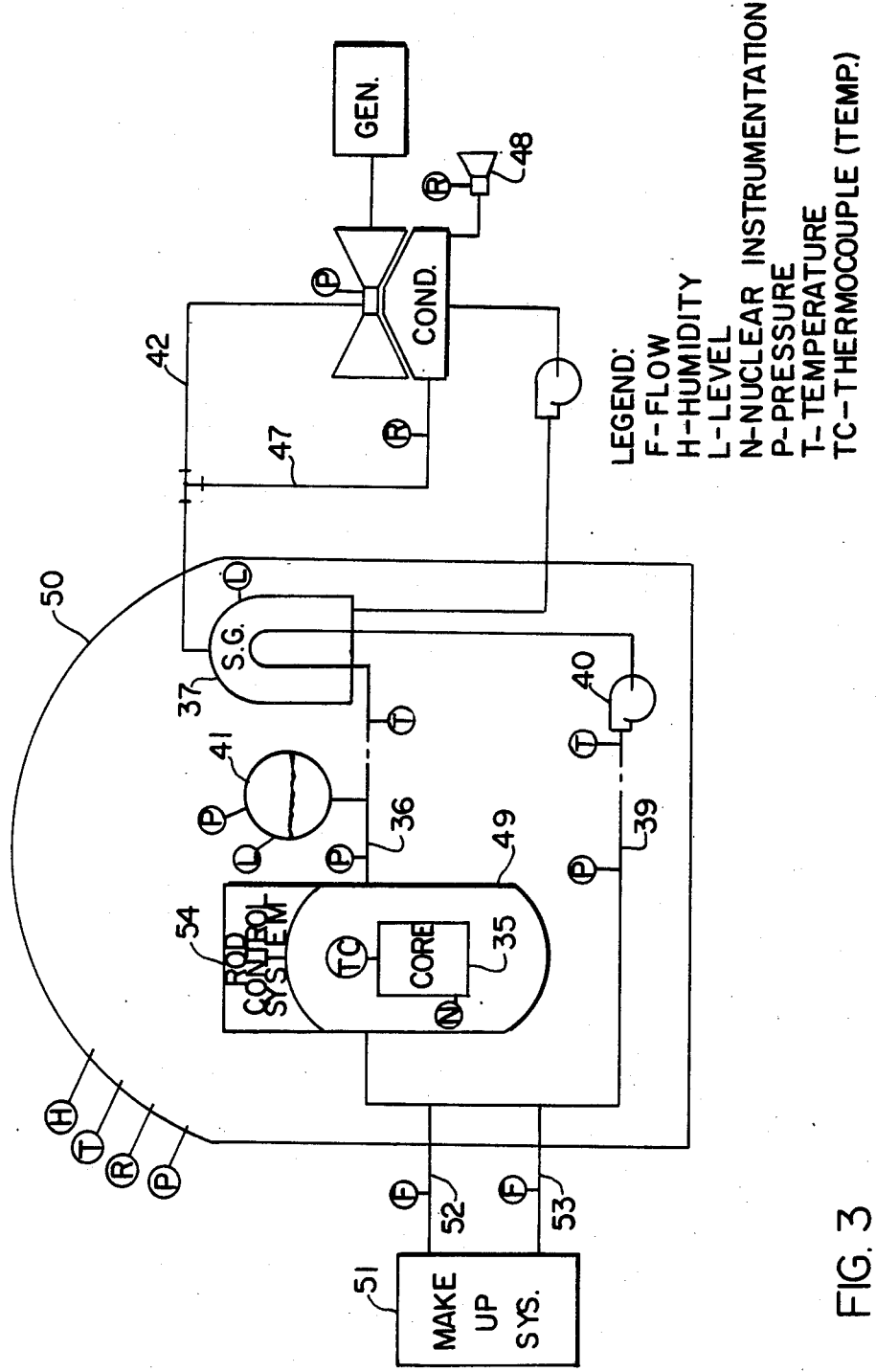
FIG. 3 is a schematic diagram of a pressurized water reactor nuclear power plant to which the invention has been applied.

The invention can be best understood by a specific example. FIG. 3 illustrates schematically a pressurized water reactor electric power generating plant to which the invention has been applied. In such a system, the fission of nuclear fuel in the reactor core 35 heats reactor coolant, water, which is circulated through hot leg piping 36 to the primary side of a steam generator 37 and back to the core 35 through cold leg piping 39 by a reactor coolant system pump 40. Typically, two to four steam generators, each with its own reactor coolant pump, are connected between the hot and cold legs. A single pressurizer 41 connected to the hot leg 36 keeps the primary circuit just described filled with water and regulates reactor coolant pressure.

Steam produced in the secondary side of the steam generator 37 by the heat of the reactor coolant, is carried by conduit 42 to steam turbine 43 where it expands to drive the electric power generator 44. Vitiated steam from the turbine is condensed in condenser 45 and the condensate is returned to the secondary side of the steam generators by condensate pump 46. A blowdown line 47 can be used to extract water from the steam generators directly into the condenser to maintain steam generator water purity. Air ejectors 48 remove air from the condenser to maintain its efficiency.

The reactor core 35 is contained within a reactor vessel 49. The reactor vessel 49, the steam generators 37, the reactor coolant system pumps 40 and the pressurizer 41 are all enclosed in a containment building 50. A make-up system 51 outside containment maintains Reactor Coolant System coolant inventory and regulates the boron concentration in the reactor coolant to provide long term control of core reactivity by preparing coolant with a desired boron concentration and introducing it through charging line 52 into cold leg 39 and/or removing coolant through let down line 53. Short term control of core reactivity is effected by a rod control system 54 which inserts neutron absorbing rods into the core 35.

Figure 4:
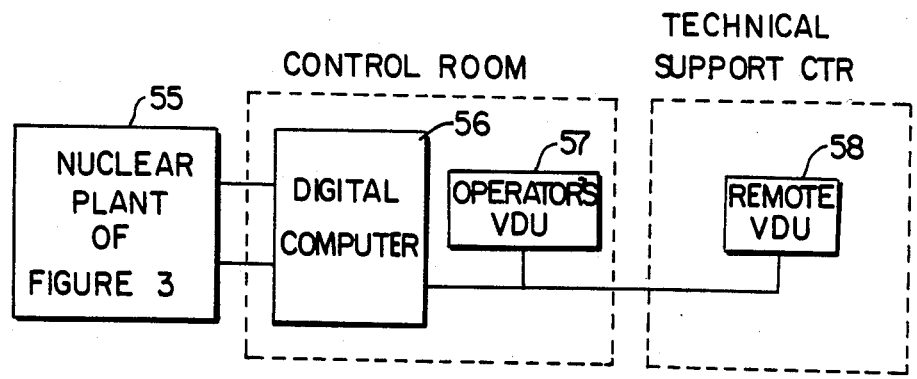
FIG. 4 is a schematic diagram in block diagram form of a system utilizing a digital computer to generate the display of this invention.

The nuclear power plant is provided with control and protection systems which automatically or through operator input control plant condition in a manner which is well known in the art. Many of these systems use digital computers for computing various limits and calculated parameters, such as for instance, reactor coolant saturation temperature and net charging flow, from measured parameters. The existing plants also include a plant computer which gathers data from the plant and uses it to monitor plant performance. The present invention utilizes the raw data gathered from the plant and some of the limits and calculated parameters calculated by the control and protection systems and the monitoring programs to generate the above described graphic displays. As illustrated in FIG. 4, these inputs from the plant and its associated systems depicted by the general reference character 55, are processed by a digital computer 56 to produce the displays which are presented on an operators' visual display unit (VDU, such as a cathode ray tube) 57 in the control room and on remote VDU's 58 in the Technical Support Center which is manned during abnormal conditions to provide overall direction to efforts to return operation to normal or to effect a safe shutdown.

Figure 5:
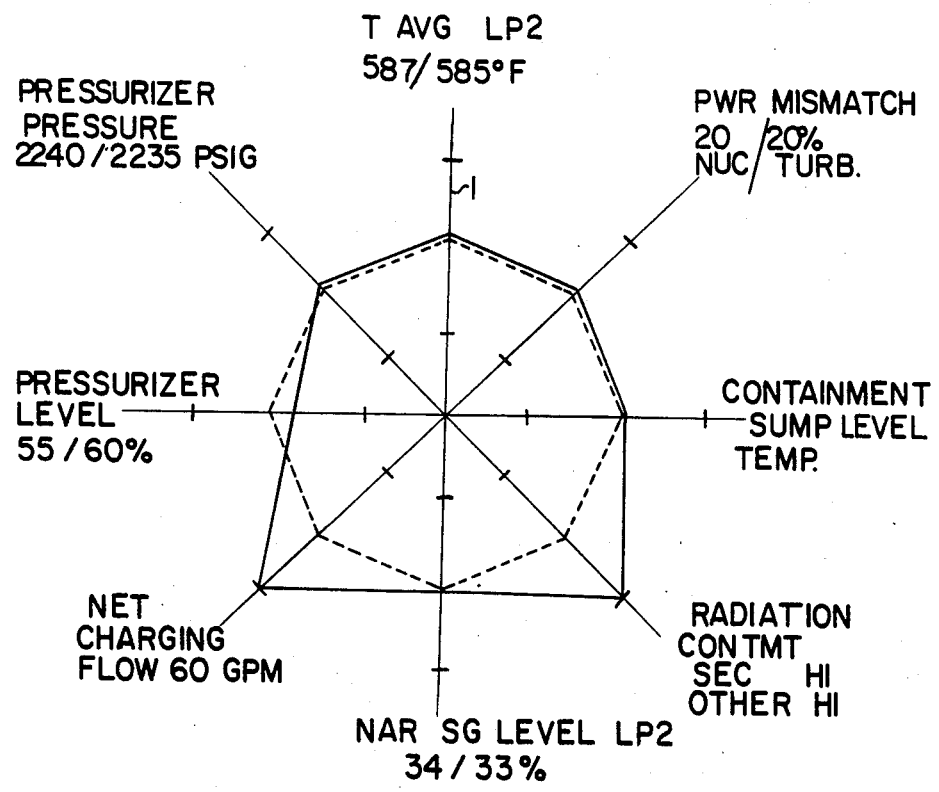
FIG. 5 is a view of a graphic display generated in accordance with the teachings of the invention while operating in a first mode to indicate the presence of an abnormality in the operation of the PWR plant illustrated in FIG. 3.

FIG. 5 illustrates a typical high level display according to the invention with the PSSD system in the terminate mode. The event illustrated is a primary to secondary coolant system leak which could occur if a leak developed in a heat exchanger tube in one of the steam generators. The plant parameters represented by each spoke and therefore each vertice of the polygon are indicated at the outer end of each spoke for identification by the operator. In addition, the numerical value or condition of the parameter is also presented. In the case of the analog signals, the actual value is presented on the left followed by the reference value. In the case of the binary signals, the word "Hi" indicates which conditions are present. FIG. 3 illustrates the sensors that are used in generating the status signals which are representative of the current value of each parameter.

Starting with the spoke at the 12 o'clock position in FIG. 5, the parameters selected to provide information on the key safety concerns in the terminate mode are the following. "$T_{avg.}$" is the average of the temperature of the reactor coolant in the hot leg nd cold leg. A $T_{avg.}$ is calculated for each loop (each steam generator) with the $T_{avg.}$ which deviates the most (positive or negative) from the reference temperature, $T_{ref.}$, being selected for display along with the loop number (loop 2 in the example) and the value of $T_{ref.}$. $T_{ref.}$ is the reference temperature used for the rod control system 54.

The second spoke of the terminate mode display of FIG. 5 illustrates "Power Mismatch" in percent. Power mismatch is the percent difference in the power being generated by the nuclear system as determined as a function of the nuclear flux in the core, 35, measured by the nuclear instrumentation system represented by the encircled letter "N" in FIG. 3 as compared to the load which is calculated in a conventional manner from the impulse chamber pressure in the turbine, 43. Power mismatch is obtained from the plant monitoring programs known in the art and the numerical value in percent of nuclear power and turbine power are indicated on the display. The limits for power mismatch are determined from an analysis of operating procedures which identify critical values of mismatch and are set in the example at +5 and −10 percent of power.

The third spoke of the terminate mode display is dedicated to two binary signals representing containment sump level and temperature alarm conditions, respectively. With both of these binary signals below preselected threshold levels, the vertice of the polygon is at the reference level as shown in FIG. 5. If, however, either or both parameters are above their threshold levels, the vertice would be displayed at the high limit tic mark. The operator is informed of which parameter or parameters are above normal by the indication "Hi" for the state in the readout next to the spoke.

Spoke number four displays three binary signals and indicates radiation levels above selected thresholds in the containment 50, the secondary system, 47, and in other plant locations such as for example, the air ejectors, 48, if provided. Again the associated vertice of the polygon is displayed at the high limit if any of these radiation readings are above the appropriate threshold and is displayed at the reference value otherwise. Since the event postulated in FIG. 5 is a primary to secondary leak which would lead to radiation in the steam supplied to the turbine which would be detected in the secondary system and in other detectors such as in the air ejectors, the vertice of the polygon on spoke 4 of FIG. 5 is displayed at the high limit. The readout next to spoke 4 indicates which radiation readings are above normal by a "Hi" in the appropriate readout.

The fifth spoke of the FIG. 5 display indicates the level of water in the secondary side of the steam generators, 37. Since the terminate mode represents the plant at power, the narrow range instrumentation for measuring water level is used. The reference value is 50% of the narrow range span with the upper and lower limits being the boundaries of narrow range measurement. Again, as in the case of $T_{avg.}$, the deviation from the reference value is determined for each steam generator with the maximum deviation, in percent, the loop number and the reference value being displayed. In the event shown, the level of water in all the units is substantially at the reference value.

Spoke 6 in FIG. 5 displays the net charging flow which is calculated by subtracting the measured flow through letdown line, 53, from the charging flow measured in charging line, 52. An offset is entered into the calculation for reactor coolant pump seal flow to make the net flow zero. The value of the net flow is indicated on the display. In the exemplary event, where makeup water would be supplied to the primary system to accommodate for losses to the secondary system, a positive net charging flow at the limiting value is indicated. The high limit for this parameter is the maximum charging rate with no letdown and the low limit is the maximum letdown rate with no charging.

The seventh spoke of the terminate mode display indicates the liquid level in the pressurizer, 41. The reference value is obtained from the level control system which is part of a state of the art control system. The high limit for pressurizer level is a constant 100% and the low limit is a constant 0%. It is clear in this case that the scales for positive and negative deviations from the reference value will differ as the reference value varies. For the primary to secondary coolant system leak represented by FIG. 5, it can be seen that the pressurizer level is below the reference value due to the leakage of water to the steam generator. The numerical values of the actual pressurizer level and the reference level are displayed in percent next to the spoke.

The last spoke in the terminate mode display represents the pressure in the pressurizer 41. The reference value for pressurizer pressure is representative of a constant operating value maintained by a control system well known in the state-of-the-art. The upper limit for the pressurizer pressure scale represents the value for which a protection system reactor trip would be expected to occur along with the actuation of pressure relief and safety valves. The lower limit represents the absolute minimum value expected to occur from large normal transients such as a plant trip. For the event postulated, the pressurizer pressure is substantially at the reference value.

From the irregular shape of the polygon illustrated in FIG. 5, the operator can hypothesize the multi-parameter event which is in progress and can then refer to other levels of the PSSD to verify the diagnosis and to assist him in taking appropriate corrective action.

Figure 6:
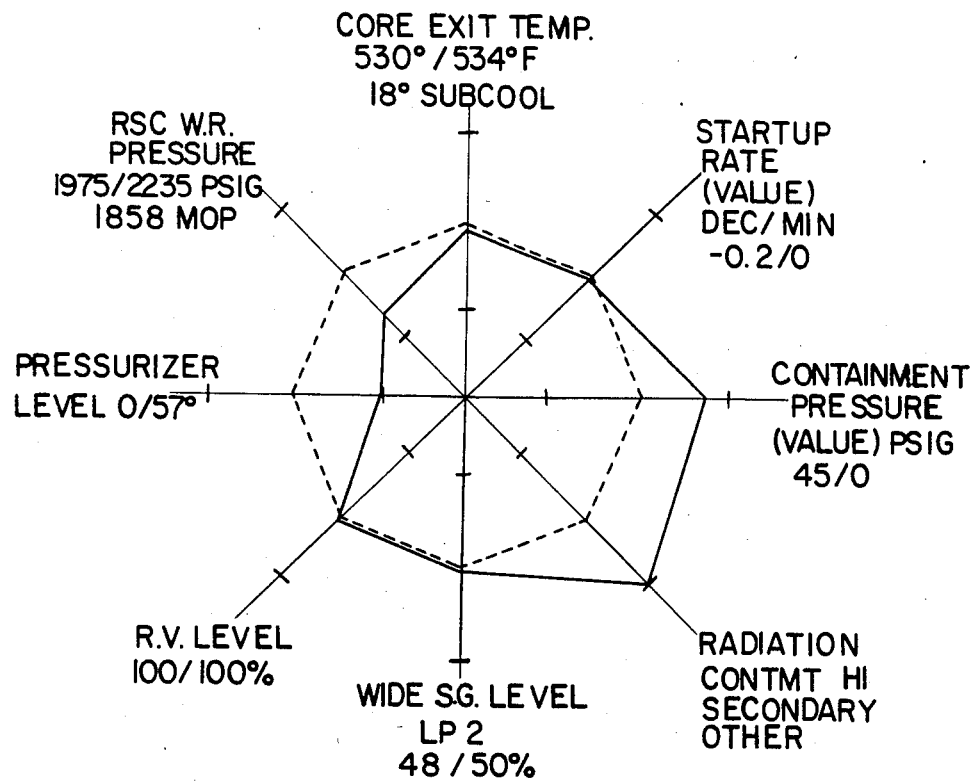
FIG. 6 is a view of a graphic display generated in a second mode of operation of the invention to inform the operator and supervisors of another abnormality in the operation of the exemplary PWR plant; and, FIGS. 7a through 10 are flow charts of programs which are used by the system of FIG. 4 to generate CRT displays such as those illustrated in FIGS. 5 and 6.

FIG. 6 illustrates a typical high level display for the mitagate mode of the PSSD and in particular, illustrates a display which could be expected for a primary coolant system leak to containment. Such a display would be presented after the protection systems initiated a reactor trip. The first spoke of this display, shown at the 12 o'clock position, represents the reactor coolant system wide range (RCS W.R.) temperature as measured by thermocouples at the surface of the reactor core. The reference value is determined from a user selectable variable temperature and pressure program which generates a target value as a function of pressure and temperature for use by the plant operator during plant heatup and cooldown operations. The high limit is the saturation temperature, $T_{SAT}$, of the coolant which is calculated from the reactor coolant system wide range (RCS W.R.) pressure measured in the pressurizer 41. $T_{SAT}$ is calculated as follows:

$$T_{SAT} = 253.715 + 0.540537P\ 2.924275 \times 10^{-4} P^2 + 5.85718 \times 10^{-8} P^3 \quad \text{Equation (3)}$$

for 415 P 2500 psi

The low limit is that corresponding to the nil ductility temperature for the reactor coolant overpressurization limit of the reactor coolant system which is well known in the state-of-the-art and is calculated using measured wide range pressure as follows:

$$T_{LO} = 0.09P + 140.68 \quad \text{Equation (4)}$$

for 415 P 2500 psi

The actual value of the RCS W.R. temperature and the reference value are presented numerically on the display. In addition, the margin of subcooling, expressed as the difference between the saturation temperature and the actual temperature, is also displayed. In the example shown, the RCS W.R. temperature is slightly below the reference value due to the fact that makeup water is being charged into the system to accommodate for the loss of containment.

The second spoke of FIG. 6, shown at 2 o'clock, displays the startup rate which is determined as a function of the core flux measured by the nuclear instrumentation system and is available from the state of the art control systems. The reference value is also obtained from the control systems and would be zero following a reactor trip. The upper limit for this parameter is a constant 5 decades per minute and the lower limit is a constant −0.5 decades per minute. The numerical value of the startup rate is displayed in decades per minute adjacent to the second spoke. For the postulated event, the rate should be zero or negative.

Spoke 3 of FIG. 6 displays pressure in containment, 50, and presents the current numerical value in psig. The lower limit of this pressure and the reference value are a constant zero psig. The high limit is a constant 60 psig. In the example given, it can be seen that the actual pressure is about 75% above the reference value or about 45 psig.

The fourth spoke of the mitigate mode display is the same as the corresponding spoke in the terminate mode and therefore displays the digital signals representing radiation above threshold levels in containment 50, secondary system or other plant systems.

The next spoke of FIG. 6 displays steam generator 37 wide range (SG W.R.) liquid level. The upper limit for SG W.R. is 100% of the wide range span and the lower limit is 0% of this span. The reference value is 50%. In the illustration, the actual value of 48% and the reference value are both shown numerically on the display.

Spoke 6 of FIG. 6 represents the reactor vessel water level (R.V. level) which is calculated from the hot leg 36 and cold leg 39 reactor coolant pressure differential and is available from the state of the art level instrumentation system. The upper limit for this parameter and the reference value are both 100% while the lower limit is 0%. The numerical value of the actual level and the reference level are presented in percent. In the given example, the RCS W.R. level is at the reference value of 100%.

Spoke 7 in the mitigate mode displays pressurizer level and is identical to spoke 7 in the terminate mode. As shown in FIG. 6, the pressurizer level is at the lower limit of zero percent with a leak of the primary system coolant into containment.

The last spoke of FIG. 6 displays the reactor coolant system wide range (RCS W.R.) pressure which, as mentioned above, is the measured pressure in the pressurizer 41. The limits for the wide range pressure scale are chosen based upon two safety concerns. The first is to maintain adequate core coolant system pressure. The low limit value in the pressure scale represents the condition where the reactor coolant fluid, normally designed to be maintained at a subcooled thermodynamic condition, reaches a pressure corresponding to saturation. This limit is calculated from measurements of primary system temperature as follows:

$$P_{SAT} = \left(\frac{T}{\alpha}\right)^{\frac{1}{\beta}} - 14.7 \quad \text{Equation (5)}$$

where T is the measured wide range reactor coolant temperature $\alpha = 118.5089$ and $\beta = 0.2209096$. The other safety concern is for integrity of the core coolant system due to overpressurization. The upper limit represents the theoretical operational stress limit for the primary coolant system. This limit, which is well known in the art, is a function of primary coolant temperature and is calculated as follows:

$$P_{High} = 11,11 * T - 1563 \text{ psia} \quad \text{Equation (6)}$$

where T is the measured wide range reactor coolant temperature. The numerical value of the RCS W.R. pressure is displayed next to the spoke. In the exemplary display, this pressure is illustrated as being substantially below the reference value. In addition to the actual and reference values for the pressure, the MOP (minimum operating pressure due to saturation at the actual core exit temperature) is displayed adjacent the spoke.

It is a significant feature of the invention that the organization of the parameters on the spokes was made to place on adjacent spokes, plant parameters which are dependent on one another, such as temperature and pressure, while parameters having a cause-consequence relationship are placed diametrically opposite one another. As an example of the latter, a reduction in steam generator level will result in an increase in core exit temperature, all other things being constant. Thus these parameters are located on opposed spokes in FIG. 6. Such an arrangement enhances operator comprehension of the overall safety condition of the plant.

Flow charts for the computer programs which are used by the plant computer 55 shown in FIG. 4 to develop the terminate and mitigate mode displays of FIGS. 5 and 6 are shown in FIGS. 7 through 10. As shown in FIG. 7a, a flag labeled "spoke" is first set equal to 1 in block 59 to begin processing of the required data for each spoke in each display. The spokes of the terminate mode display shown in FIG. 5 are numbered 1 through 8 in a clockwise direction beginning with the "$T_{avg}$." spoke at the 12 o'clock position. The spokes of the mitigate mode display of FIG. 6 are numbered 9 through 16 in a similar manner beginning with the "RCS W.R. Temp." spoke. As will be seen, all spokes of both displays are processed even though only one mode will be displayed.

After setting "spoke" equal to one, a loop which develops the required data for each spoke is entered at block 60. When all of the spokes have been processed, the program is complete, but until then the program advances to block 61 where the data for the spoke under consideration is initialized to normal conditions by setting the color of the tic marks for the limits on that spoke to yellow, by setting the "vector" which represents the location of the vertice of the polygon along that spoke to the reference point and by setting a flag to draw the vector which means that the sides of the polygon joining that vertice to the adjacent vertices should be drawn on the display.

Next, a determination is made in block 62 whether the parameters represented by the spoke under consideration are binary or analog signals. If spoke 3 or 4 is being processed indicating that the signals are binary, the state of the binary signals identified with these spokes in connection with the discussion of FIG. 5 are obtained in block 63 together with their qualities. A subroutine "VECT D", which as discussed below, organizes the data for each of the binary signals presented on the spoke, is then entered at block 64. Upon completion of the "VECT D" subroutine, the final quality of the data as determined by it is checked in block 65 and if the quality is bad, a flag is set in block 66 not to draw the vector, meaning not to display an actual value for any of the digital signals associated with that spoke and not to draw the adjacent sides of the polygon. In either case, the "spoke" flag is advanced by 1 in block 67 and the program returns to block 60 to process the next spoke.

If at block 62 it is found that spoke 3 or 4 is not under consideration, a determination is made in block 68 whether it is instead spoke 12. If it is, this spoke in the mitigate mode presents the same information as spoke 4 in the terminate mode and therefore all of the data previously generated for spoke 4 is copied for spoke 12 in block 69 before the program advances to spoke 13 in block 67.

Figure 7A:
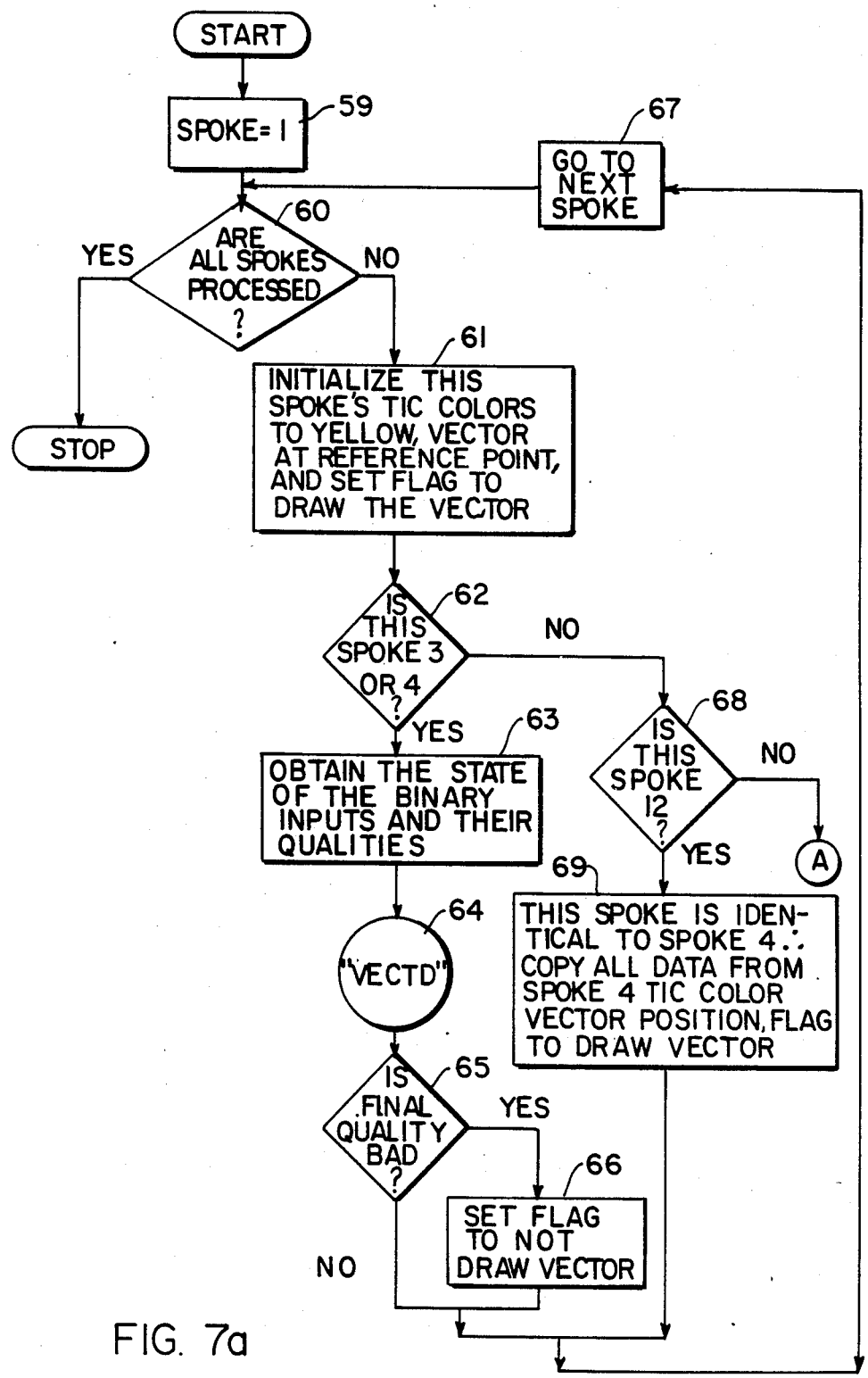
Figure 7B:
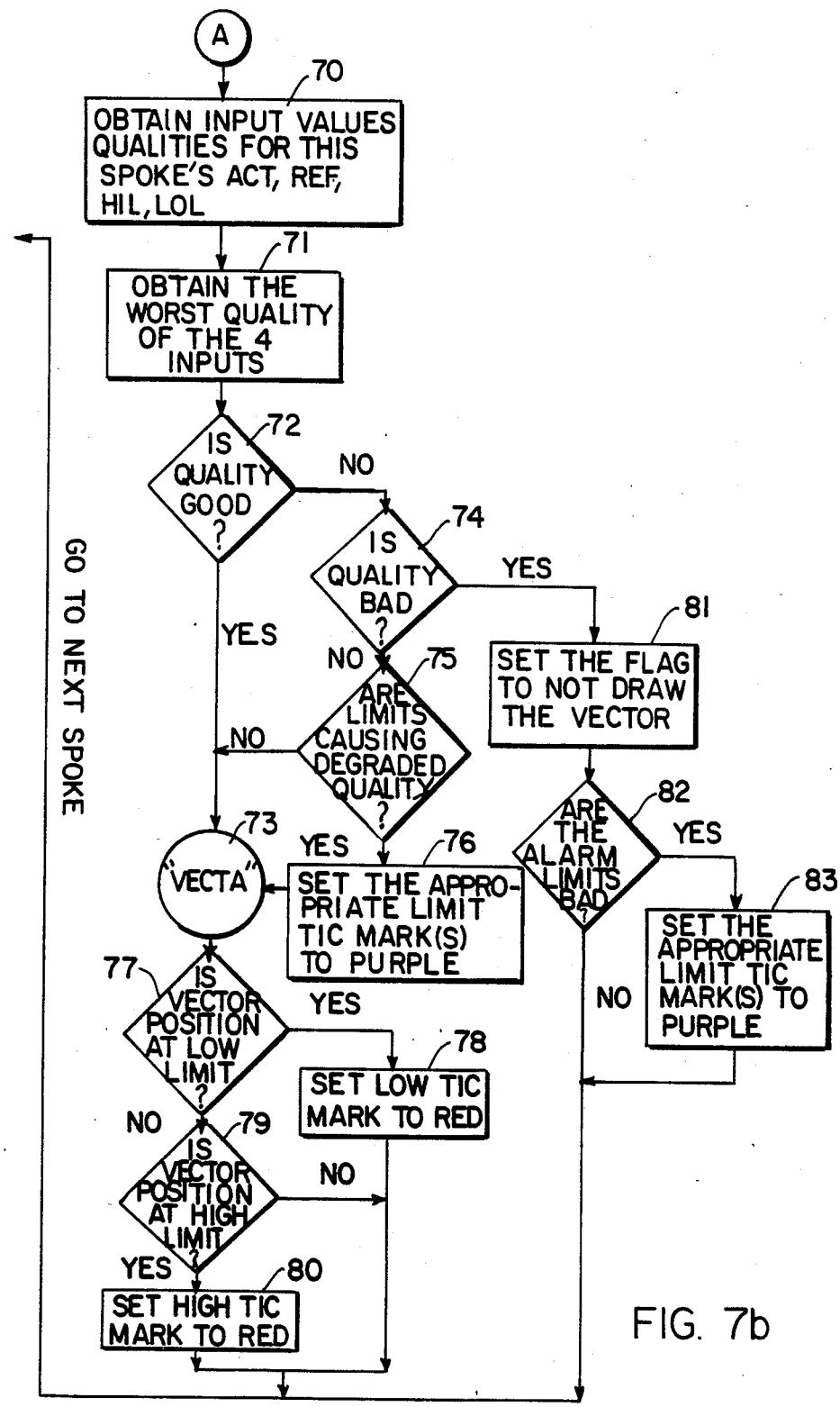

If the spoke under consideration presents analog rather than binary data, the tag "A" shows that the program transfers to block 70 in FIG. 7b where the input values and qualities for that spoke, including the actual parameter value, ACT; the reference value, REF; the high limit, HIL; and the low limit, LOL are obtained. In block 71, the worst quality of these four parameters is determined and if this worst quality is "good" as determined in block 72, a "VECT A" subroutine which processes the data for that spoke is entered at block 73. If the worst quality is not "good", a determination is made in block 74 whether or not it is "bad". If it is not "bad" it must be either "manual" or "poor", and a check is made in block 75 to see if it is either of the limit signals HIL or LOL which is causing the degraded quality. If they are not the reason for the degraded quality, the "VECT A" subroutine is entered directly. Otherwise, a flag is set in block 76 to make the appropriate limit tic mark purple before the VECT A subroutine is entered.

Upon return from the VECT A subroutine, the low and high limit tic marks are set to red in blocks 78 and 80 respectively if the actual value "vector position" of the parameter is at the corresponding limit as determined in block 77 or 79 before the program returns to block 67 in FIG. 7a to advance to the next spoke.

If the worst quality of the inputs for an analog signal is "bad" as determined in block 74, a flag is set in block 81 not to draw the vector and if one of the limits is causing the "bad" indication as determined in block 82, a flag associated with the appropriate limit tic mark is set in block 83 to make the mark purple before advancing to the next spoke in block 67.

Figure 8:
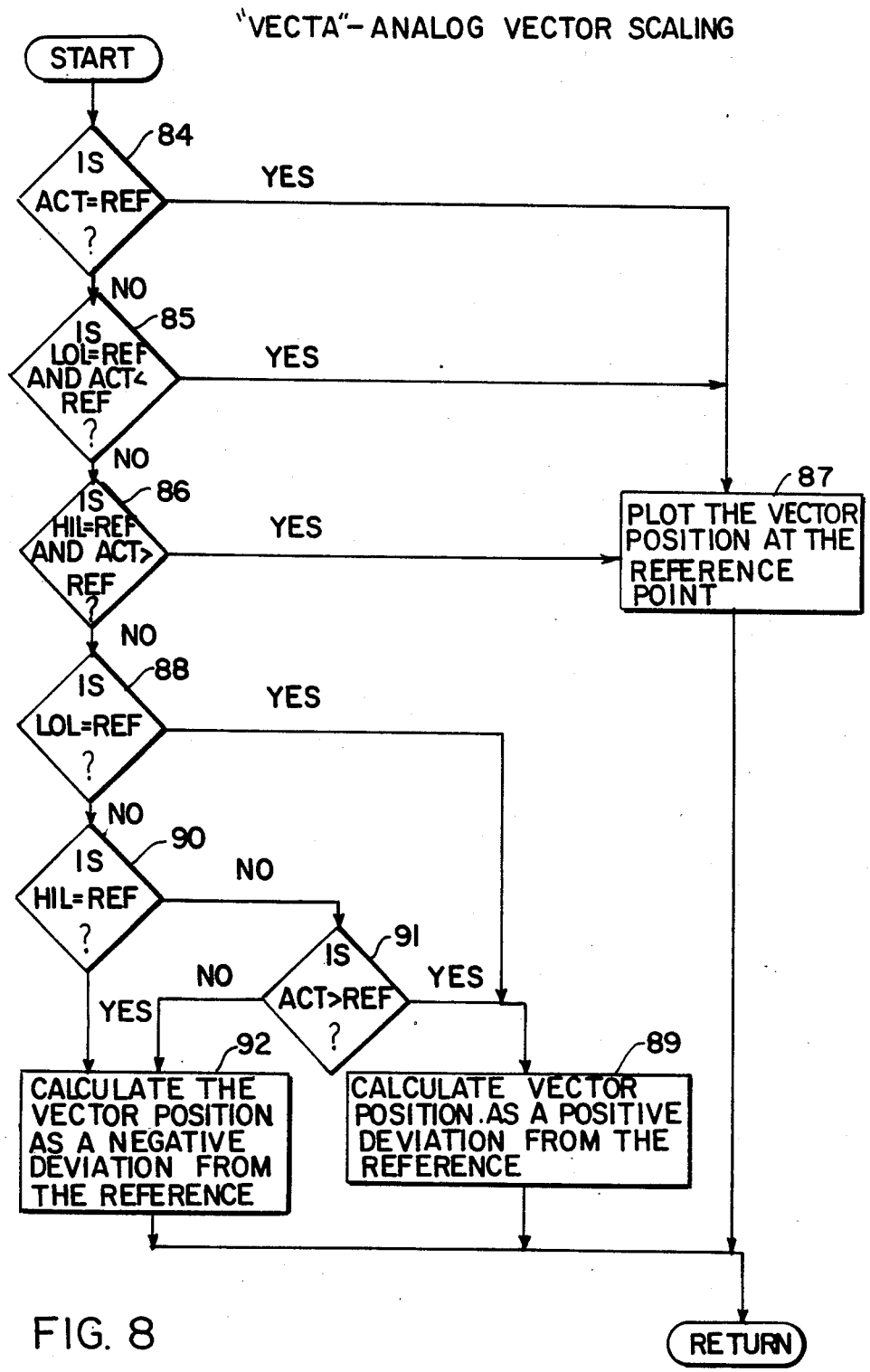

FIG. 8 illustrates the "VECT A" subroutine for determining the analog scaling. If the actual value of the parameter equals the reference value block 84, or the low limit equals the reference value and the actual value is less than the reference value block 85, or the high limit equals the reference value and the actual value exceeds the reference value block 86, the vector position or location of the vertice of the polygon is plotted at the reference point in block 87 and the program returns to block 77 in FIG. 7b. If none of these conditions exist, but the low limit is the reference value as determined in block 88, the vector position or location of the vertice of the polygon is calculated in block 89 as a positive deviation from the reference using Equation (1) above. Equation (1) is also used in block 89 to calculate the vector position as a positive deviation from the reference, if the reference value is between the low and high limits as determined in blocks 88 and 90 and the actual value exceeds the reference value as determined in block 91. On the other hand, if the reference value equals the high limit in block 90 or the actual value of the parameter is less than the reference value as determined in block 91, then the vector position is calculated in block 92 as a negative deviation from the reference using Equation (2) above. When the analog vector position has been calculated, the program returns to block 77 of FIG. 7b.

Figure 9:
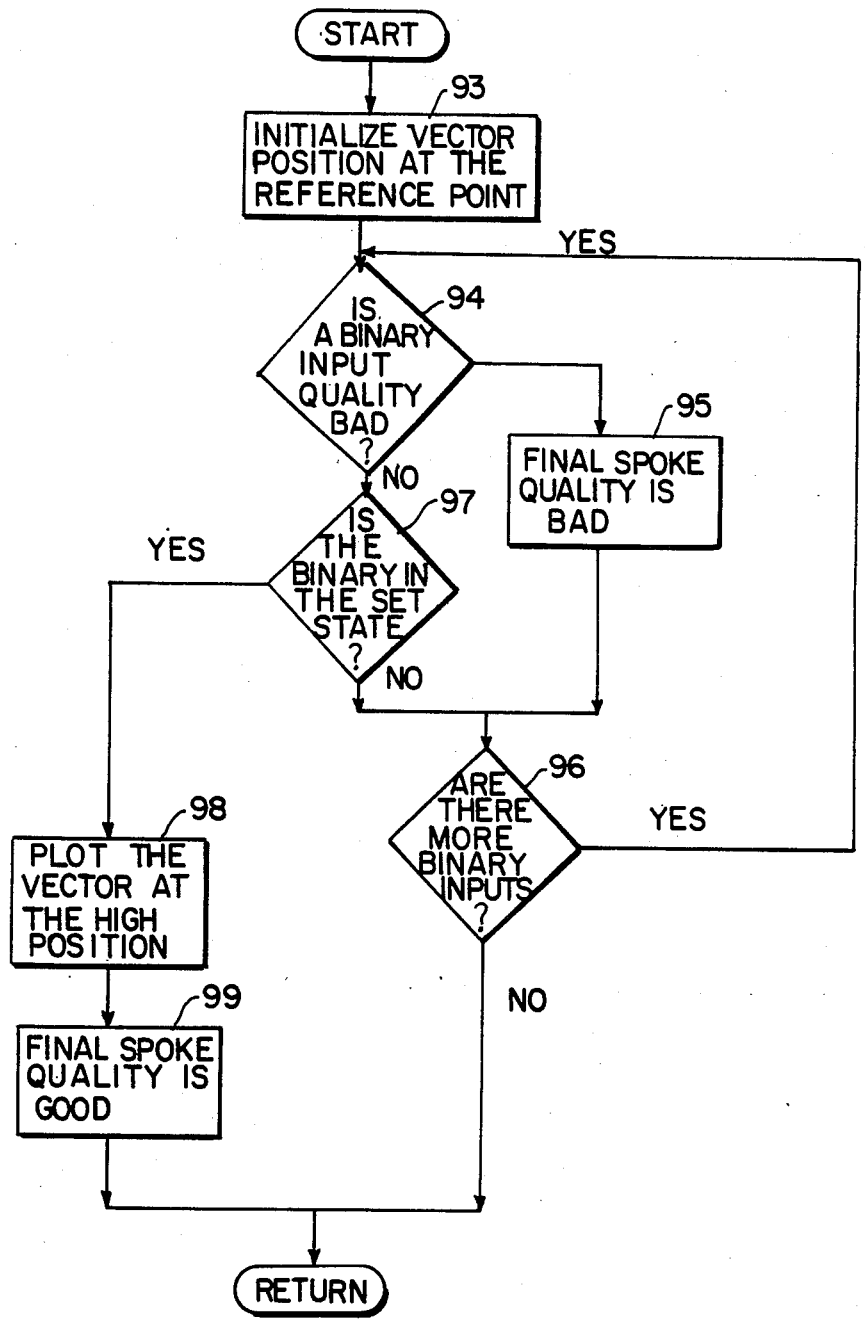

FIG. 9 sets forth the flow chart for the "VECT D" subroutine which provides the scaling for spokes representing binary status signals. As a first step, the vector or vertice position is initialized to the reference position in block 93. If a check in block 94 indicates that the quality of a binary input for that spoke is "bad", a flag is set in block 95 indicating that final spoke quality is "bad" and if any other binary signals associated with that spoke remain as determined in block 96, the quality of the next binary input is examined in block 94. If the quality of the digital signal is not "bad" but it is not in the set state as determined in block 97, the program also advances through block 96 to the next binary input if any. When the quality of a digital signal is not "bad" and it is in the set state, the vector is plotted at the high limit position in block 97 and the final spoke quality is set equal to "good" in block 99 before the program returns to block 65 in FIG. 7a. The subroutine is also exited from block 96 when no further digital signals remain to be examined.

Figure 10:
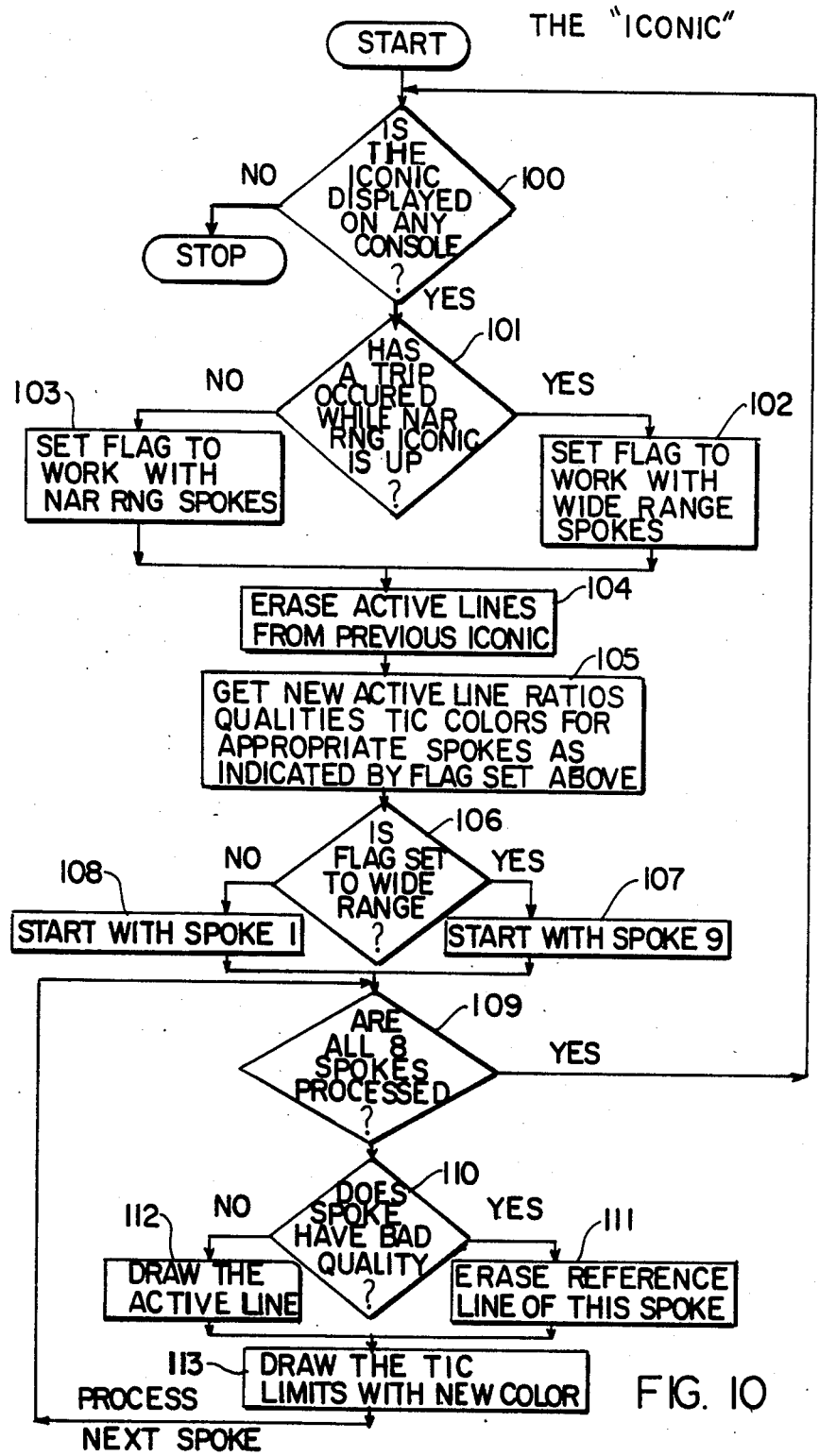

FIG. 10 illustrates the flow chart for the iconic program which utilizes the data developed in the preceeding programs to generate the displays on the visual display units 57 and 58 in the control room and in the technical support center. As mentioned previously, there are several levels of displays in the PSSD system which can be called up by those monitoring the plant safety status. If the iconic or top level display has not been selected for display on any of the visual display units as determined in block 100 the remainder of the iconic program is not needed and is therefore not run. Assuming that at least one observer is calling for the top level display, a determination is made in block 101 whether a reactor trip has occurred while the terminate mode display of FIG. 5 is being displayed. If it has, a flag is set in block 102 to work with the wide range spokes of the mitigate mode. If not, the flag is set as indicated in block 103 to work with the narrow range spokes of the terminate mode. In either case, all the active lines from the previous iconic display are then erased in block 104 and are replaced in block 105 by the new line ratios, qualities, and tic colors determined by the programs of FIGS. 7 through 9 for the spokes indicated by the flag set in either block 102 or 103. If the flag is set to wide range (mitigate mode) as determined in block 106, spoke 9, the spoke at the 12 o'clock position in FIG. 6 is selected in block 107 as the starting point for developing the display otherwise spoke 1 of FIG. 5 is selected in block 108. A loop is then entered at block 109 to process the selected spokes. If the spoke being processed has "bad" quality as determined in block 110, the lines joining the vertice on that spoke with the adjacent vertices are blanked in block 11 so that they do not appear on th VDU display. If, however, the quality is not "bad", these lines are drawn as indicated in block 112. Whether or not the lines are drawn, the tic marks indicating the limits for that spoke are drawn in block 113: yellow when the actual value of the parameter is within limits, red when it is at the limit, and purple when the quality of either limit signal associated with the spoke is "bad". The program then returns to block 109 to process the next spoke. When all of the spokes of the selected mode display have been processed, the program returns to block 100 to be run again. This program updates the display about every two seconds.

The advanced graphic display which is the subject of this invention provides two distinct advantages over conventional control indicators: it provides a concise, systems level oriented, integration of parameters, and it does so with, a graphic display format. The detection of an abnormal condition is enhanced as the operator task is based upon the discrimination of two geometric figures. Multi-parameter decisions and event evaluation is facilitated by the integrated nature of the display and the fact that only differences in parameters are highlighted by the display. The operator upon detecting abnormalities is then able to seek more specific information at other information levels to support the reaction, diagnosis, and terminate/mitigate activities.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of generating on a visual display device a real time display indicative of the safety status of a complex process plant at the current operating level as represented by the status of selected operating parameters, said method comprising the steps of:
   generating status signals representative of the value of said selected operating parameters measured on a real time basis;
   generating on a real time basis reference signals for each of said operating parameters representative of the target signal level for each of said status signals for the current operating level of the plant;
   generating a limit for each parameter representative of a limiting value for each of said status signals,
   normalizing each status signal to its associated reference signal in such a manner that the normalized status signal has a first fixed, preselected magnitude when the status signal equals the associated reference signal, has a second fixed magnitude when the status signal equals the associated limit, and has a magnitude determined by a variable scale, which is a function of the magnitude of the reference signal and the limit when the magnitude of the status signal is between the magnitude of the reference signal, and that of the limit, and
   generating from said normalized status signals a display on the visual display device which emanates from a common origin with respective sectors of said display each being defined by the magnitude of at least one normalized status signal in such a manner that with all of the displayed operating parameters measured at the target values, all of the respective sectors of the display will exhibit an equal relationship to said origin.

2. The method of claim 1 wherein the display defines a polygon and wherein the magnitudes of the normalized status signals determine the distances of the vertices of the polygon from the common origin with all of the vertices being at a first fixed distance from the common origin to form a regular polygon when all of the selected operating parameters are at the target values, said vertices being at a second fixed distance from the common origin when the associated status signal equals the associated limit signal, and said vertices being at points between the first and second fixed distances determined by the associated variable scale when the magnitude of the status signal is between that of the reference signal and limit signal.

3. The method of claim 2 wherein the step of generating a display includes generating spokes which radiate from the common origin and extend outward through each vertice of the polygon.

4. The method of claim 3 wherein the step of generating said display includes generating a second polygon on the visual display device, said second polygon being a regular polygon having its vertices at said first fixed distance from said common origin whereby the said second polygon represents the reference values for each of said operating parameters.

5. The method of claim 4
   wherein the step of generating the display on the visual display device includes displaying indicia on the associated spokes at said second fixed distance from the common origin of the display representing the location of the associated vertice of the polygon as determined by the magnitude of the normalized status signal when the measured value of the operating parameter equals the limiting value.

6. The method of claim 5 wherein the step of generating said limit signals includes generating high and low limit signals for at least some of said parameters wherein the step of normalizing said status signals includes normalizing each said status signal having associated high and low limit signals in a manner such that the normalized status signal has a magnitude determined by a first variable scale which is a function of the magnitude of the reference signal and high limit signal when the status signal is between the reference signal and high limit, and has a magnitude determined by a second variable scale which is a function of a magnitude of the reference signal in the low limit signal when the status signal is between the reference signal and the low limit, with said normalize status signal having said first fixed magnitude when the status signal equals the reference signal, said second fixed magnitude which is greater than the first fixed magnitude when the status signal equals the high limit, and third fixed magnitude which is less than a first magnitude when a status signal equals a lower limit, and wherein generating said display includes displaying each vertice of the polygon associated with a status signal having an associated high and low limit at said first fixed distance when the normalized status signal has said first fixed magnitude, at said second fixed distance from the origin which is greater than the first fixed distance when the status signal has said second fixed magnitude, and at a third fixed distance from the origin which is less that the first fixed distance when the normalized status signal has said third fixed magnitude, with each such vertices displayed at a point between said first and second fixed distances determined by the first variable scale when the magnitude of the status signal is greater than the reference signal and at a point between said first and third fixed distances determined by the second variable scale when the magnitude of the status signal is less than a reference signal.

7. A method of generating on a visual display device a real time display indicative of the safety status of a nuclear power plant at the current operating level as represented by the status of selected operating parameters, said method comprising the steps of:
generating status signals representative of the value of said selected operating parameters measured on a real time basis,
generating on a real time basis reference signals for each of said operating parameters representative of the target signal level for each of said status signals for the current operating level of the nuclear power plant, at least some of which real time reference signals vary in magnitude with changes in said operating level,
generating on a real time basis limit signals for each parameter signal representative of a limiting value for each status signal for the current operating level of the nuclear plant, at least some of which limit signals may vary in magnitude with changes in the operating level,
normalizing each status signal to its associated reference signal in such a manner that the normalized status signal has a first fixed, preselected magnitude when the status signal equals the associated reference signal regardless of the magnitude of the reference signal and has a second fixed magnitude when the magnitude of the status signal equals the magnitude of the limit signal, regardless of the magnitude of the limit signal, and
generating from said normalized status signals a display on the visual display device in the form of a polygon with the magnitude of at least one of the normalized status signals determining the distance of each vertice from a common origin, and with all of the vertices being displayed at a first fixed distance from the common origin to form a regular polygon when all of the selected operating parameters are at the target values, a vertice being displayed at a second fixed distance from the common origin when the corresponding parameter is at its limit value, and a vertice being displayed between the first and second fixed distances on a variable scaled determined by the difference between the current values of the associated reference signal and limit signal when the value of the parameter is between the reference and limit value.

8. The method of claim 7 wherein the variable scale on which the vertice is displayed when the value of the associated parameter is between the references and limit values is a fractional scale on which the location of the vertice is defined by the ratio of the difference between the status signal and the reference signal to the difference between the limit signal and the reference signal.

9. The method of claim 7
wherein the step of generating the display on the visual display device includes displaying indicia on said visual display device at said second fixed distance from the common origin of the display representing the location of the associated vertice of the polygon as determined by the magnitude of the normalized status signal when the measured value of the operating parameter equals the limiting value.

10. The method of claim 9 wherein said step of generating limit signals includes generating high and low limit signals for at least some of said operating parameters representative of high and low limiting values for those operating parameters at the current operting level of the nuclear reactor, wherein said normalizing step includes normalizing said status signals having associated high and low limiting values to the associated reference signal in such a manner that each such normalized status signal has said first fixed magnitude when the status signal equals the associated reference signal, said second fixed magnitude when the status signal equals the high limit signal, and a third fixed magnitude which is less than said second fixed magnitude when the status signal equals the low limits signal, and wherein said step of generating a display on the visual display device includes displaying such vertices having associated high and low limiting values at said first fixed distance from the common origin when the corresponding parameter is at the target value, at said second fixed distance when the associated parameter is at the high limiting value, and at a third fixed distance which is less than said second fixed distance when the parameter is at the low limiting value, with such vertices being displayed relative to said fixed distances on a variable scale determined by the current values of the reference signal and the high limit signal when the magnitude of the status signal exceeds that of the reference signal and on another variable scale determined by the current values of the reference signal and the low limit signal when the magnitude of the status signal is below that of the reference signal.

11. The method of claim 10 wherein the step of generating said display includes displaying indicia representing the high limit for said some operating parameters at said second fixed distance from said common origin regardless of the magnitudes of the high limit signals, and displaying indicia representing the low limit at said third fixed distance from said common origin which is less than said second fixed distance regardless of the magnitude of the low limit signals.

12. The method of claim 11 wherein the step of generating the display includes generating spokes which radiate from the common origin and extend outward through each vertice of the polygon and wherein said indicia representative of the high and low limits are displayed on said spokes at said second and third fixed distances from the origin.

13. The method of claim 12 wherein the step of generating the display further includes displaying a reference polygon in the form of a regular polygon having each ot its vertices positioned on one of said spokes at said first fixed distance from the common origin.

14. The method of claim 13 wherein certain of said operating parameters are selected operating conditions in the reactor, wherein the associated status signals are binary signals having first and second discrete values representative of the absence and presence respectively of the associated condition and wherein the step of generating the display includes displaying the associated vertice of the polygon defined by the magnitude of the status signals at said first fixed distance from the common origin when the sttus signal has said first value and at said second fixed distance from the common origin when the status signal has said second value.

15. The method of claim 7 wherein at least one of said status signals is a binary signal having first and second discrete values representative of the absence and presence respectively of a selected current reactor operating condition and wherein the step of generating the display includes displaying the associated vertice of the polygon at said first fixed distance from the common origin when said binary status signal has said first discrete value and displaying the associated vertice at a second fixed distance from the common origin when said digital status signal has said second discrete value.

16. The method of claim 15 wherein at least two of said status signals are binary signals having first and second discrete values and wherein said step of generating said display includes displaying a selected vertice of said polygon at said first fixed distance when both of said binary status signals have their first discrete value and displaying the selected vertice at said second fixed distance from said common origin when either of said binary status signal equals its second discrete value.

17. The method of claim 7 wherein the step of generating the display further includes generating as an additional polygon, a reference polygon in the form of a regular polygon having each of its vertices at said first fixed distance from the common origin.

18. The method of claim 17 wherein the step of generating the display further includes generating spokes which radiate from the common origin and extend outward through each of the vertices of the polygon.

19. The method of claim 18 including the step of evaluating the quality of said status signals and wherein said step of generating said display include indicating thereon the quality of the status signals.

20. The method of claim 14 wherein said evaluating step also includes evaluating the quality of said reference signals and wherein said step of generating the display includes indicating thereon the quality of the reference signals.

21. The method of claim 20 wherein said evaluating step includes designating the quality of said status and reference signals as bad when they do not meet selected standards and wherein said indicating steps comprise not displaying the sides of the polygon enamating from a vertice of the polygon associated with a status or reference signal which has been designated as having bad quality.

22. The method of claim 21 including the step of designating the quality of a limit as bad if it does not meet selected standards and wherein said step of generating said display ncludes displaying indicia of said limits on said display and not displaying the two sides of the polygon emanating from a vertice when the quality of a limit associated with a parameter represented by that vertice is designated as bad.

23. The method of claim 22 including modifying the indicia of a limit when the quality of that limit is designated as bad.

24. The method of claim 10 wherein the step of generating said display includes selecting a first set of status signals representing a first set of parameters for display in association with the vertices of the polygon when said nuclear power plant is operating in a first mode and selecting a second set of status signals representing a second set of parameters for display when said nuclear power plant is operating in a second mode.

25. The method of claim 24 wherein the parameters are selected for display for each mode of operation of the nuclear power plant based upon their relevance to selected key safety concerns.

26. The method of claim 25 wherein the nuclear power plant is a pressurized water reactor plant and wherein said key safety concerns include at least some of the following: saturation of reactor coolant, reactivity excursion, loss of primary coolant inventory, loss of pressure and temperature control, radioactive release, and containment environment.

27. The method of claim 26 wherein the first mode of operation of the reactor is an at power mode and wherein the status signals selected for display in the power mode include signals representative of at least some of the following: average temperature of the reactor coolant, mismatch between power generated by the reactor and the load; containment humidity and temperature; radiation in containment, blowdown system, and air ejectors; steam generator liquid level; net charging flow; pressurizer level; and pressurizer pressure.

28. The method of claim 26 wherein the second mode of operation of the pressurized water reactor plant includes a tripped condition and wherein the status signals selected for display when the plant is operating in said second mode include at least some of the following: reactor coolant system wide range temperature; reactor startup rate; containment pressure; radiation in containment, and in blowdown and air ejector systems; steam generator liquid level; reactor vessel water level; pressurizer liquid level; and reactor coolant system wide range pressure.

29. The method of claim 10 wherein the variable scale on which a vertice is displayed when the status signal exceeds the reference scale is a first fractional scale of which the vertice is displayed at a point defined by the ratio of the difference between the status signal and the reference signal to the difference between the high limit signal and the reference signal, and wherein said another variable scale on which the vertice is displayed when the status signal is smaller than the reference signal is a second fractional scale on which the vertice is displayed at a point defined by the ratio of the difference between the reference signal and the status signal to the difference between the reference signal and the low limit signal.

30. Apparatus for generating a display representing the real time safety status of a nuclear power plant at the current operating level as represented by the status of selected operating parameters comprising;

means for measuring selected parameters on a real time basis and for generating status signals representative thereof;

means for generating reference signals representative of a target value for each of the status signals at the current operating value of the nuclear plant;

means for generating a limit signal for each parameter representative of a limiting value for each of said status signals;

processing means for normalizing each status signal to its associated reference signal on a fractional scale defined by the ratio of the difference between the current magnitudes of the status signal and reference signal to the difference between the current magnitudes of the reference signal and the limit signal in such a manner that the normalized status signal has a first fixed preselected magnitude when the status signal equals the magnitude of the reference signal regardless of the magnitude of the reference signal, and has a second fixed magnitude when the magnitude of the status signal equals the magnitude of the limit signal, regardless of the magnitude of the limit signal; and means for generating from said normalized status signals a display on a visual display device in the form of a polygon with the distance of each vertice of the polygon from a common origin being determined by the magnitude of a normalized status signal with all of the vertices being at a first fixed distance from the common origin to form a regular polygon when all of the selected operating paramters are at the target values, with a vertice being at a second fixed distance from the origin when the normalized status signal equals the limit signal, and with a vertice being displayed between said first and second fixed distances on said fractional scale when the status signal is between the reference signal and the limit signal.

31. The apparatus of claim 30 wherein said display generating means includes means for generating a second polygon on said visual dispay device, said second polygon being a regular polygon having its vertices at said first fixed distance from said common origin such that the second polygon represents the reference values of the selected operating parameters.

32. The apparatus of claim 31 wherein said limit generating means includes means for generating on a real time basis high and low limit signals for at least some of said selected operating parameters representative of high and low limiting values for the associated status signals for the current operating level of the nuclear reactor, wherein said processing means includes means for normalizing each status signal on a first fractional scale which defines the value of the normalized status signal by the ratio of the difference between the current magnitudes of the status signal and reference signal to the difference between the current magnitudes of the reference signal and the high limit signal when the status signal exceeds the reference signal, and on a second fractional scale defined by the ratio of the difference between the current magnitudes of the status signal and reference signal to the difference between the reference signal and the low limit signal when the status signal is less than the reference signal, and wherein said display generating means includes means for displaying indicia on the visual display device at the second fixed distance from the common origin of the display representing the location of the associated vertice of the polygon when the magnitude of the normalized status signal equals the high limit and indicia at a third fixed distance from the common origin representative of the location of the vertice when the normalized status signal equals the low limit and for displaying relative to said fixed distances, the vertices of the first mentioned polygon representative of the current values of said status signals on said first factional scale when said status signal exceeds the reference signal, and on said second fraction scale when the status signal is smaller than said reference signal.

* * * * *